US012754418B2

(12) United States Patent
Radojkovic et al.

(10) Patent No.: US 12,754,418 B2
(45) Date of Patent: Oct. 6, 2026

(54) REFLECTION DISPLAY SYSTEM AND METHOD FOR OPERATING A REFLECTION DISPLAY SYSTEM WITH MASKING DETECTION

(71) Applicant: Bayerische Motoren Werke Aktiengesellschaft, Munich (DE)

(72) Inventors: Peter Radojkovic, Munich (DE); Christopher Roelle, Groebenzell (DE); Armin Wagner-Gentner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 304 days.

(21) Appl. No.: 18/576,469

(22) PCT Filed: Jun. 23, 2022

(86) PCT No.: PCT/EP2022/067243
§ 371 (c)(1),
(2) Date: Jan. 4, 2024

(87) PCT Pub. No.: WO2023/025434
PCT Pub. Date: Mar. 2, 2023

(65) Prior Publication Data

US 2024/0302654 A1 Sep. 12, 2024

(30) Foreign Application Priority Data

Aug. 26, 2021 (DE) ..................... 10 2021 122 157.9

(51) Int. Cl.
*G02B 27/01* (2006.01)
*G06F 3/14* (2006.01)
(Continued)

(52) U.S. Cl.
CPC ........... *G02B 27/0101* (2013.01); *G06F 3/14* (2013.01); *G09G 3/006* (2013.01); *G09G 3/32* (2013.01); *G09G 2360/144* (2013.01)

(58) Field of Classification Search
CPC . G02B 27/0101; G02B 2027/014; G06F 3/14; G09G 3/006; G09G 3/32; G09G 2360/144
See application file for complete search history.

(56) References Cited

U.S. PATENT DOCUMENTS

2005/0140929 A1 6/2005 Nambudiri et al.
2010/0264835 A1 10/2010 Bilenko et al.
(Continued)

FOREIGN PATENT DOCUMENTS

CN 105954160 A 9/2016
DE 10 2004 031 311 A1 1/2006
(Continued)

OTHER PUBLICATIONS

International Search Report (PCT/ISA/210) issued in PCT Application No. PCT/EP2022/067243 dated Oct. 7, 2022 with English translation (5 pages).
(Continued)

*Primary Examiner* — Mustak Choudhury
(74) *Attorney, Agent, or Firm* — Crowell & Moring LLP

(57) ABSTRACT

A method for operating a reflection display system is provided. The reflection display system includes a display unit configured with a micro-LED display in order to output the display image via a display surface of the display unit. The method includes operating at least some of the LED diodes of the micro-LED display in sensor fashion in order in each case to detect a light intensity of incident ambient light; recognizing that a foreign object is present on the display surface depending on the measured light intensities in the
(Continued)

LED diodes operated in sensor fashion; and signaling a disturbance of the display of the display image in the event of the foreign object being recognized on the display surface.

13 Claims, 2 Drawing Sheets

(51) Int. Cl.
*G09G 3/00* (2006.01)
*G09G 3/32* (2016.01)

(56) References Cited

U.S. PATENT DOCUMENTS

| | | | | |
|---|---|---|---|---|
| 2013/0221851 | A1 | 8/2013 | Coates | |
| 2016/0252452 | A1 | 9/2016 | Thun et al. | |
| 2018/0364790 | A1 | 12/2018 | Thorgeirson et al. | |
| 2018/0366570 | A1* | 12/2018 | Knox | H10D 62/221 |
| 2019/0204592 | A1* | 7/2019 | Fujita | G02B 27/0006 |
| 2020/0225472 | A1* | 7/2020 | Aoki | B60K 35/10 |
| 2022/0066210 | A1 | 3/2022 | Andoh et al. | |
| 2022/0146818 | A1 | 5/2022 | Inoue et al. | |

FOREIGN PATENT DOCUMENTS

| | | | |
|---|---|---|---|
| FR | 3 064 081 | A1 | 9/2018 |
| WO | WO 2020/189646 | A1 | 9/2020 |
| WO | WO 2021/002055 | A1 | 1/2021 |

OTHER PUBLICATIONS

German-language Written Opinion (PCT/ISA/237) issued in PCT Application No. PCT/EP2022/067243 dated Oct. 7, 2022 with English translation (8 pages).
German Search Report issued in German Application No. 10 2021 122 157.9 dated Apr. 14, 2022 with partial English translation (10 pages).
Chinese-language Office Action issued in Chinese Application No. 202280041830.1 dated Mar. 31, 2026, with English translation (18 pages).

* cited by examiner

REFLECTION DISPLAY SYSTEM AND METHOD FOR OPERATING A REFLECTION DISPLAY SYSTEM WITH MASKING DETECTION

BACKGROUND AND SUMMARY

The invention relates to windshield display systems, in particular reflection display systems, such as a PHUD, for motor vehicles. The present invention relates in particular to measures for detecting an object located in the optical beam path of the windshield display system.

Reflection display systems such as PHUDs comprise a display unit, which is arranged on the upper side of the instrument panel and whose display is mirrored on the inner side of the windshield, which can be perceived by a vehicle occupant. The display unit is arranged in this case somewhat recessed in the upper side of the instrument panel, and so a direct view of the display surface of the display unit is prevented in order to avoid the user being dazzled by light being incident directly in the eye.

However, by arranging the display unit in such a recess in the upper side of the instrument panel, foreign objects on the display unit are not easily visible either from the normal eye positions of the vehicle occupants. These foreign objects, however, are disposed in the beam path of the display image and can obscure parts of the display, and legally relevant display symbols, such as velocity indication, compartment lights, remaining range and the like, may therefore not be visible, and the absence of these display symbols may not be noticed either because they are not permanently displayed.

The use of a cover glass, such as is used in conventional head-up displays, for example, is a disadvantage in such reflection display apparatuses because new reflections of ambient light onto the windshield may occur which significantly impair the perceivability of the reflection image at high ambient brightness.

Until now, approaches merely involve the detection of foreign objects located on the display unit by way of additional devices, such as cameras or light barriers or the like.

It is the object of the present invention to make available an improved method for detecting obscurations of a display image in a reflection display system.

This object is achieved by a method for operating a reflection display system and by a reflection display system according to the claimed invention.

According to a first aspect, a method for operating a reflection display system for displaying a display image for a vehicle occupant of a motor vehicle by way of reflection of the display image at a reflection surface, in particular at a windshield, is provided. The reflection display system includes a display unit, which is configured with a micro-LED display in order to output the display image via a display surface of the display unit, wherein the display unit is arranged on an upper side of an instrument panel such that a reflection of the display image is perceivable via the windshield in an eye region of a vehicle occupant. The method has the following steps:

- operating at least one part of the LED diodes of the micro-LED display for sensing to detect a respective light intensity of incident ambient light;
- detecting the presence of a foreign object on the display surface depending on the measured light intensities in the LED diodes which are operated for sensing; and

- signaling a disruption of the display of the display image during the detection of the foreign object on the display surface.

Foreign objects placed on the instrument panel may obscure components intended for representing information via the windshield completely or in part. If the reflection display system is used for representing safety-relevant information, it is necessary, however, to be able to distinguish between non-display of information and the display of the information being blocked by a foreign object located on top.

Foreign objects within the meaning of this invention can be any objects that impede the perception of a display image, such as for example items of clothing, documents and the like.

In particular when the display unit is arranged in a recess in the upper side of the instrument panel, however, foreign objects on the display unit are not easily visible from the normal eye positions of the vehicle occupants. These foreign objects, however, are located in the beam path of the display image and may thus obscure parts of the display, which means that any safety-relevant and legally prescribed display symbols, such as for example velocity indication, compartment lights, remaining range and the like, are not visible. However, the absence of these display symbols may not be easily noticed because they are not permanently displayed.

It is possible with the aid of the aforementioned reflection display system to detect whether the display surface of the display unit is free from foreign objects located thereon. It is possible thereby to detect whether the beam path of the reflection display system is disrupted by a foreign object on the display surface. Detecting such an interruption of the display of the reflection display system is significant for being able to signal a warning or other countermeasures. The aforementioned reflection display system consequently enables automated detection of a foreign object on the display surface of the display unit which disturbs the display image.

Furthermore, the display unit can be arranged in the recess such that the display image which is represented on the display surface of the display unit is not perceivable directly in the eye region.

A micro-LED display has a matrix of LEDs in the form of diodes. The LEDs can emit light if there is an active supply of electricity. The micro-LED matrix has LEDs for emitting light of different wavelength ranges. The LEDs in the matrix can be controlled individually so as to accordingly output image representations via the display surface.

The design of the micro-LED display additionally makes it possible to operate the LEDs for sensing, such that they operate as photodiodes. These photodiodes are light-sensitive to the correspondingly configured wavelength and supply a diode current as brightness signal, which is dependent on the intensity of the incident light. So if a foreign object is located on the display surface, it screens off ambient light, with the result that a region of very low light intensity on the micro-LED display can be detected. The region of very low light intensity can be interpreted as a foreign object being located thereon.

Provision may be made for a light source to be arranged in a region above the display unit, which light source enables an increase in ambient light which is required for the measurement of the presence of a foreign object located on top by way of the micro-LED display.

The detection of a foreign object located on top may be continuous. Since a display of a display image and the detection are not possible at the same time, it is advantageous that the reading of the light incidence on the LED diodes takes place periodically during a time period which is sufficiently short, such as between 30 and 50 ms, so that this time period cannot be perceived as an interruption of the imaging via the reflection display system.

In a further embodiment, a part of the LEDs can be operated actively to emit light, and neighboring LEDs can be operated for sensing to detect the incidence of light. The LEDs operated for sensing are distributed over the area of the display surface of the micro-LED display between the actively operated LEDs. Because of this it is possible for light for detecting the foreign object to be provided by the micro-LED matrix itself. In effect, the actively operated LEDs of the micro-LED matrix then emit light that is reflected at the foreign object and results in a characteristic pattern of the reflected light that can be recognized. In this way, it is possible, for example, for the actively operated LEDs and the LEDs which are operated, for sensing, as detectors to be arranged in the matrix adjacent to one another, in particular adjacent to one another in alternation. If the active LEDs are then controlled in a pulsed manner with a pulse pattern, this pulsed light is reflected at any foreign object that may lie on top and be reflected back onto the LEDs located below, which are operated for sensing. These LEDs detect incident light and recognize by the presence of light that is pulsed with the specific pulse pattern that the foreign object is present. LEDs that are not covered by a foreign object thus do not detect the pulsed light from the active LEDs and can therefore ascertain that there is no foreign object on the display surface.

According to a further aspect, a reflection display system for displaying a display image for a vehicle occupant of a motor vehicle by way of reflection of the display image at a reflection surface, in particular at a windshield, is provided, comprising:

- a display unit, which is configured with a micro-LED display in order to output the display image via a display surface of the display unit, wherein the display unit is arranged on an upper side of an instrument panel such that a reflection of the display image is perceivable via the windshield in an eye region of a vehicle occupant, and
- a control unit, which is configured
  - to operate at least one part of the LED diodes of the micro-LED display for sensing to detect a light intensity of incident ambient light;
  - to detect the presence of a foreign object on the display surface depending on the measured light intensities in the LED diodes which are operated for sensing; and
  - to signal a disruption of the display of the display image during the detection of the foreign object on the display surface.

According to a further aspect, a motor vehicle is provided, comprising an instrument panel between a windshield of the motor vehicle and a steering column; and the aforementioned reflection display system.

Embodiments will be illustrated in more detail below with reference to the appended drawings.

DETAILED DESCRIPTION OF THE DRAWINGS

Figure 1:
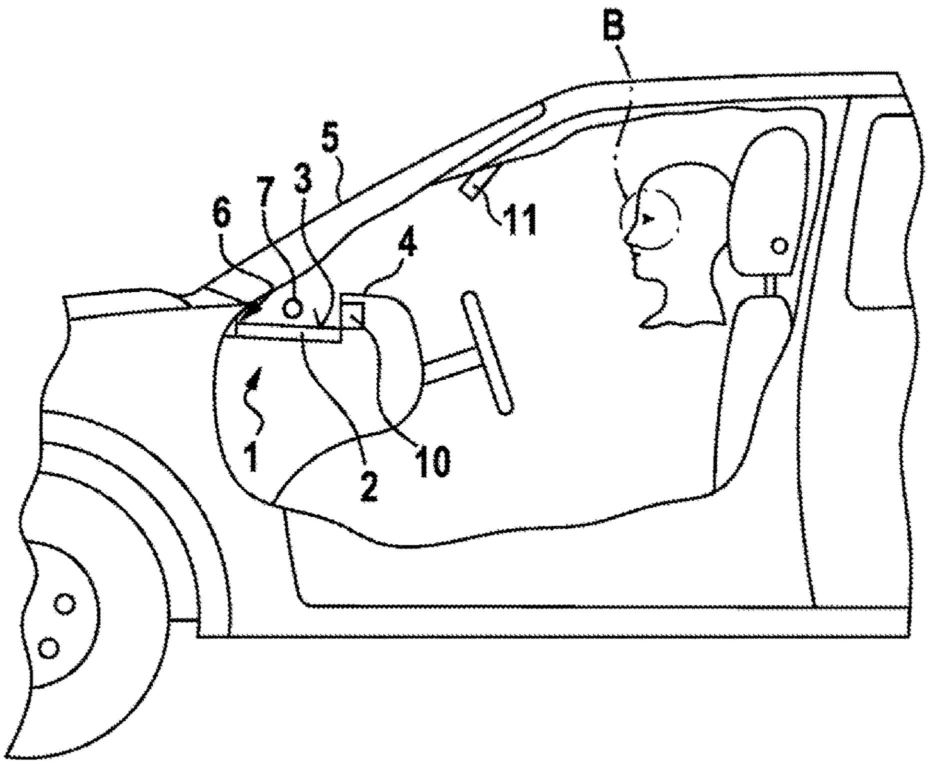
FIG. 1 shows a schematic cross-sectional illustration of a reflection display system in a motor vehicle.

FIG. 1 shows a schematic cross-sectional illustration of a motor vehicle with a reflection display system 1. The reflection display system is arranged on an upper side of an instrument panel 4 and has a display unit 2, which comprises a display surface 3 for representing a display image. The display unit 2 is arranged on the upper side of the instrument panel 4 below a windshield 5.

The display surface 3 is oriented in relation to the windshield 5 such that a display image that is displayed on the display surface of the display unit 2 is reflected at a lower region of the inner side of the windshield 5 and can be perceived by a vehicle occupant in an eye region B. In this way, the orientation of the display unit 2 or of its display surface can preferably be substantially parallel to the vehicle longitudinal axis and transverse axis or differ therefrom by an angle of no more than 0-200.

The display unit 2 can be mounted in a recess 6 of the instrument panel such that no direct view of the display surface 3 of the display unit 2 is possible for the vehicle occupant and dazzling of the vehicle occupants due to direct light from the display surface 3 in the eye region B is avoided. Furthermore, the display surface 3 of the display unit 2 is oriented such that a displayed display image is reflected at the inner side of the windshield 5 and can be perceived by a vehicle occupant in an eye region B as a reflection image on the windshield 5.

The display unit 2 is preferably configured as a micro-LED display unit in order to provide a very bright display image, such that the reflection produced can be perceived via the corresponding region of the windshield 5 even at high ambient brightness.

Since the display unit 2 is arranged in the recess 6 in the upper side of the instrument panel 4, a foreign object 7 can also enter this recess 6 and in this way come to lie on the display surface 3 of the display unit 2. A display image displayed on the display unit 2 then cannot, or can only partially, be perceived by a vehicle occupant as a reflection image.

Figure 2:
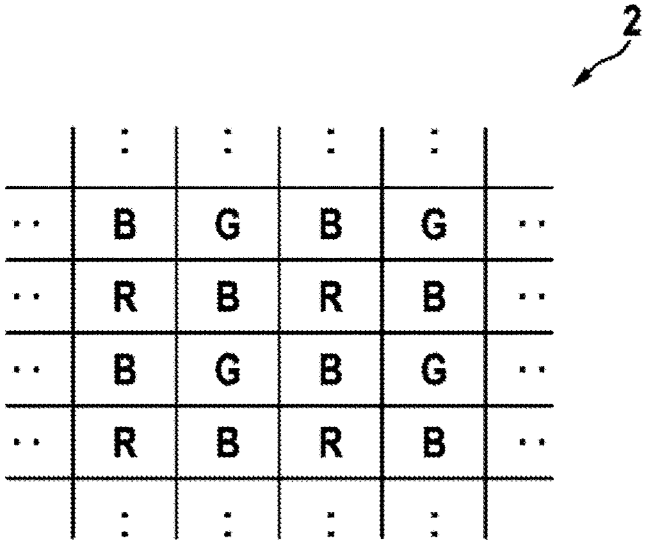
FIG. 2 shows a top view of an exemplary micro-LED display.

The display unit 2 is configured as a micro-LED display unit in order to provide a very bright display image, such that the reflection produced can be perceived via the corresponding region of the windshield 5 even at high ambient brightness. FIG. 2 shows the setup of a micro-LED matrix, wherein in each case groups of four pixels with different colors red R, green G, blue B are provided.

To detect whether or not the foreign object 7 lies on the display surface 3, a control unit 10 can be configured to use the display unit 2 not only to display the display image but also to sense the presence of a foreign object 7 on the display surface 3. For this purpose, the control unit 10 is configured to operate, at regular time intervals, the LEDs of the micro-LED display or a part of the LEDs of the micro-LED displays as photodiodes, in each case for a short period of time. Due to the possibility of selectively controlling the micro-LED display in active operation, there is also the possibility of operating the LEDs of the micro-LED display selectively in a sensing mode as a photodiode. The LEDs which are operated for sensing then provide a brightness signal indicating the brightness of the light that is received thereby.

The short period of time corresponds to a period of time for which the active display is interrupted, and therefore this period of time is not perceivable if it is less than 50 ms.

During the short period of time, it is then possible by evaluating an electrical variable measured as a brightness signal by the LEDs which are operated for sensing to ascertain the presence of a foreign object 7 on the display surface 3. The electrical variable represents the light intensity of the ambient light that is incident on the corresponding photodiode. The evaluation as to whether a foreign object 7 is located on the display surface 3 is preferably performed by using all the LEDs of the micro-LED display as photodiodes. Alternatively, only a part of the LEDs that covers in particular the area of the entire display surface may also be used to detect a foreign object 7 located on top. The remaining LEDs can continue to be operated actively.

In particular it is possible to detect whether there is a region on the display surface 3 at which no incidence of light is determined. In particular if further LEDs operated for sensing ascertain at the same time that the ambient brightness is sufficiently high to ascertain a corresponding incidence of light on the relevant photodiodes, it is accordingly possible to deduce that a foreign object 7 is located on top. In this way, a foreign object 7 located on top can be detected if the detected light intensities of LEDs which are in particular operated for sensing at the same time differ by more than a specified absolute differential amount.

Alternatively, an external light source 11 can be provided, which directs light at the display surface 3 continuously or only for the period of time during which the LEDs or the corresponding part of the LEDs are operated for sensing. In particular, it is advantageous for detecting a foreign object 7 located on top to use the micro-LED display with LEDs with infrared light sensitivity and to configure the external light source 11 to be an infrared light source. This avoids disruption of the driver due to the external light source 11 in the vehicle interior.

In one alternative embodiment, additional light can also be provided by the actively operated LEDs themselves. In particular, the LEDs may be arranged in alternation during the detection of a foreign object on top and can be operated actively and for sensing such that an LED that is adjacent to an LED operated for sensing is operated actively. The light intensity detected by the LED operated for sensing can then vary depending on whether light from an adjacently operated active LED is reflected at a foreign object 7 which is located directly on the display surface 3 or whether the emitted light leaves the region of the micro-LED display without reflection.

In order to better distinguish foreign objects 7 located on top from regions in which no foreign object 7 is present, the light emitted by the actively operated LEDs can be pulsed, in particular with a specific pulse pattern, which is detected by the remaining LEDs operated for sensing. If this pulse pattern is received by the micro-LEDs operated for sensing, the light intensity of the received brightness signal can be checked according to a threshold value comparison in order to filter out direct couplings of the emitted pulse pattern into the LEDs operated for sensing. If the light intensity of the pulse pattern which is received by the LEDs operated for sensing lies above a specified threshold value, a foreign object can be detected. In this way, the reflection display system and in particular the method for detecting a foreign object located on top can be designed to be resistant to disruption.

In further embodiments, it is also possible to detect obscuration of the display surface without using a pulse pattern, in that the light intensity (brightness signal) that is sensed is checked by way of a threshold value comparison. Here, the specified threshold value can be dependent on the brightness of the ambient light. In the case of a low ambient brightness which results in a brightness signal of the LEDs operated for sensing that is lower/weaker than the brightness signal when a foreign object 7 is located on top, an obscuration event can be detected if the light intensity lies above a specified threshold value. The specified threshold value of the brightness signal is then determined such that it represents a brightness signal that corresponds to a brightness signal as is brought about by a foreign object 7 located on top, which reflects poorly or as normal.

In the case of a high ambient brightness which results in a brightness signal of the LEDs operated for sensing that is higher/stronger than the brightness signal when a foreign object 7 is located on top, an obscuration event can be detected if the light intensity or the detected brightness signal lies below a specified threshold value. The specified threshold value of the brightness signal is then determined such that it represents a brightness signal that corresponds to a brightness signal as is brought about by a foreign object 7 located on top, which reflects well or as normal. This provides two threshold values which can be selected in dependence on the ambient brightness.

If the reflection display system 1 is configured without an external light source, the evaluations can be combined over a plurality of successive detection cycles in order to mask temporary shadows, such as caused by houses, trees or other structures, during a journey. Only if a plurality of temporally successive events are detected for which the detected light intensity lies above a specified threshold value can a foreign object be detected.

Figure 3:
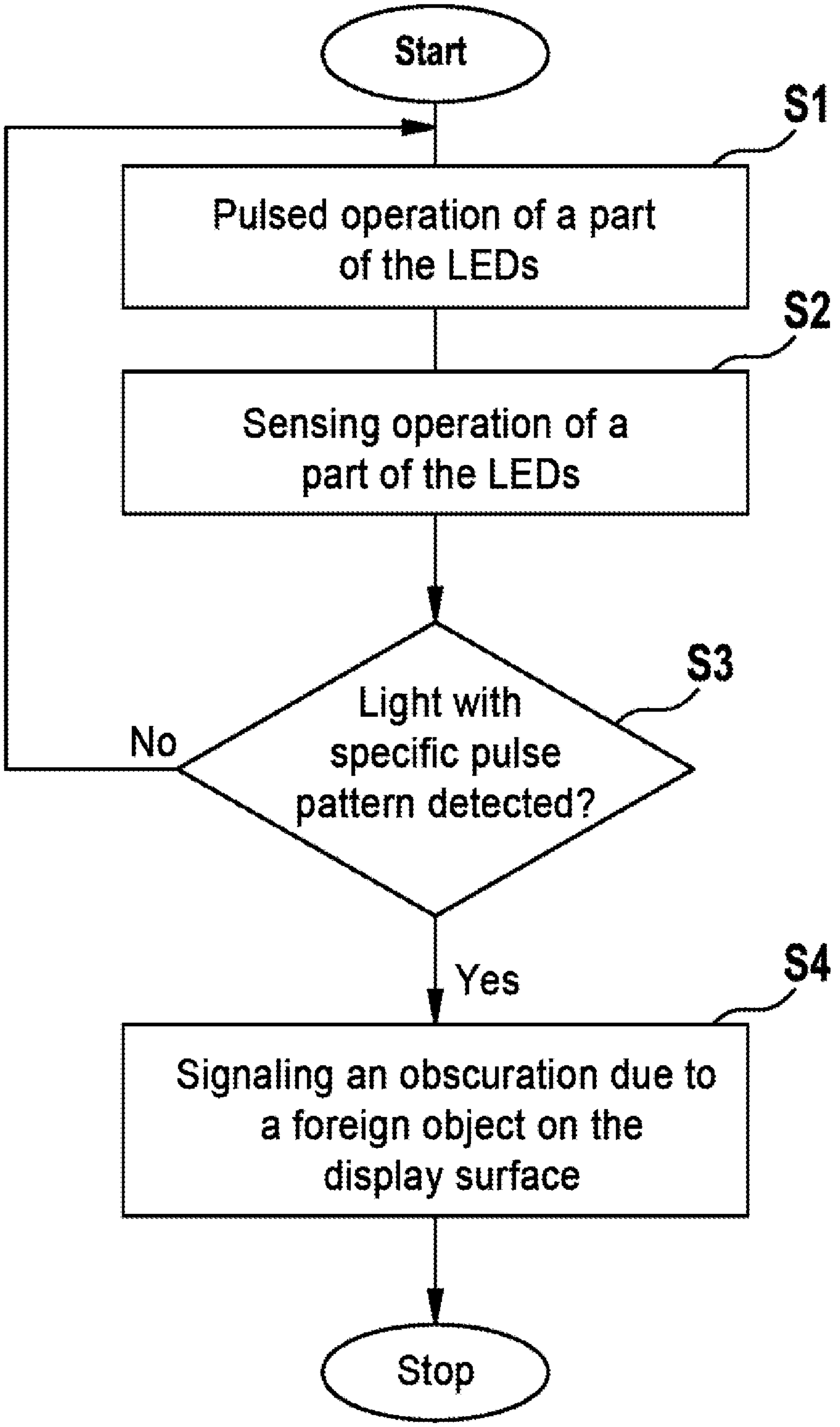
FIG. 3 shows a flowchart for illustrating a method for signaling the presence of a foreign object on the display surface of the display unit.

FIG. 3 shows a flowchart for illustrating a method for detecting a foreign object 7, which can be performed in the control unit 10.

In step S1, a part of the LEDs of the display unit 2 is operated in a pulsed manner with a pulse pattern.

In step S2, a part of the LEDs of the display unit 2 is operated for sensing.

In step S3, a check is performed as to whether the LEDs operated for sensing receive light or a brightness signal with the specific pulse pattern. If this is the case (alternative: yes), the method is continued with step S4; if not (alternative: no), the method jumps back to step S1.

If the presence of a foreign object 7 on the display surface 3 is detected in step S3, step S4 will signal the presence of a foreign object 7 on the display surface 3. The signaling can be performed with the aid of a visual or acoustic signal or in another way that alerts the vehicle occupants to the fact that the display is at least partially obscured.

LIST OF REFERENCE SIGNS

1 Reflection display system
2 Display unit
3 Display surface
4 Instrument panel
5 Windshield
6 Recess
7 Foreign object
10 Control unit
11 External light source

What is claimed is:

1. A method for operating a reflection display system for displaying a display image for a vehicle occupant of a motor vehicle by way of reflection of the display image at a windshield, wherein the reflection display system comprises a display unit which is configured with a micro-LED display comprising a matrix of LEDs in order to output the display image via a display surface of the display unit, and the display unit is arranged on an upper side of an instrument panel such that a reflection of the display image is perceivable via the windshield in an eye region of the vehicle occupant, the method comprising:

operating at least one subset of the LEDs of the micro-LED display as sensors to measure respective light intensities of incident light;

detecting a presence of a foreign object on the display surface depending on the light intensities measured by the LEDs which are operated for as sensors; and signaling a disruption of the display of the display image during the detection of the foreign object on the display surface.

2. The method according to claim 1, wherein the incident light is incident ambient light.

3. The method according to claim 1, wherein the at least one subset of the LEDs are operated actively and as sensors in alternation.

4. The method according to claim 3, wherein the at least one subset of the LEDs are operated as sensors for a time period which is not perceivable by a user.

5. The method according to claim 1, wherein:

a part of the LEDs of the micro-LED display are at least temporarily operated actively to emit light and, simultaneously, neighboring LEDs are operated for as sensors to detect incidence of light, and the LEDs which are operated as sensors are distributed over an area of the display surface of the micro-LED display between the actively operated LEDs, so that light that is provided by the actively operated LEDs is reflected at the foreign object located on top of the display surface and is detectable by the LEDs operated as sensors.

6. The method according to claim 5, wherein:

the actively operated LEDs are controlled in a pulsed manner with a specific pulse pattern, and light which is detected by the LEDs which are operated as sensors is evaluated by virtue of a fact that, when light that is pulsed with the specific pulse pattern is recognized, the presence of the foreign object is detected.

7. The method according to claim 5, wherein:

the foreign object located on top is detected in dependence on a threshold value comparison, and a threshold value is determined depending on an ambient brightness.

8. A reflection display system for displaying a display image for a vehicle occupant of a motor vehicle by way of reflection of the display image at a windshield, the reflection display system comprising:

a display unit, which is configured with a micro-LED display comprising a matrix of LEDs in order to output the display image via a display surface of the display unit, wherein the display unit is arranged on an upper side of an instrument panel such that a reflection of the display image is perceivable via the windshield in an eye region of the vehicle occupant, and a control unit, which is configured:

to operate at least one subset of the LEDs of the micro-LED display as sensors to measure respective light intensities of incident light;

to detect a presence of a foreign object on the display surface depending on the light intensities measured by the LEDs which are operated as sensors; and to signal a disruption of the display of the display image during the detection of the foreign object on the display surface.

9. The method according to claim 8, wherein the incident light is incident ambient light.

10. The reflection display system according to claim 9, further comprising an external light source which increases a light intensity of the ambient light.

11. The reflection display system according to claim 10, wherein:

the external light source is configured for emitting infrared light, and at least the LEDs of the micro-LED display which are operated as sensors are configured to detect incident infrared light.

12. The reflection display system according to claim 8, wherein the display unit is arranged in a recess such that the display image which is represented on the display surface of the display unit is not directly perceivable in the eye region.

13. A motor vehicle comprising:

the instrument panel between the windshield of the motor vehicle and a steering column; and the reflection display system according to claim 8.

* * * * *